United States Patent [19]

Sang Jo et al.

[11] Patent Number: 5,053,878
[45] Date of Patent: Oct. 1, 1991

[54] IRIS CIRCUIT OF A VIDEO CAMERA

[75] Inventors: Park Sang Jo, Anyang; Lee Sang Ho; Eom Young Ku, both of Suwon, all of Rep. of Korea

[73] Assignee: SamSung Electronics Co. Ltd., Maetan-Dong, Rep. of Korea

[21] Appl. No.: 378,928

[22] Filed: Jul. 12, 1989

[30] Foreign Application Priority Data

Jul. 12, 1988 [KR] Rep. of Korea ............... 1988-11355

[51] Int. Cl.$^5$ ............................................. H04N 5/238
[52] U.S. Cl. ............................... 358/228; 358/213.19
[58] Field of Search ............ 358/228, 909, 209, 213.19

[56] References Cited

U.S. PATENT DOCUMENTS

| | | | |
|---|---|---|---|
| 4,050,085 | 9/1977 | Prince et al. ........................ | 358/228 |
| 4,542,403 | 9/1985 | Zimmermann et al. ............. | 358/228 |
| 4,638,350 | 1/1987 | Kato et al. .......................... | 358/228 |
| 4,689,689 | 8/1987 | Saito et al. .......................... | 358/228 |
| 4,714,966 | 12/1987 | Saito et al. ........................ | 358/228 |

Primary Examiner—Stephen Brinich
Attorney, Agent, or Firm—Robert E. Bushnell

[57] ABSTRACT

An iris circuit of a video camera which can automatically adjust opening and shutting of the iris of a camera lens according to the magnitde of a NAM (non additive magnitude) signal provided by taking out the highest value from the peak values of R,G and B color video signals. The iris circuit includes means for detecting each of the peak value and the means value of the NAM signal, and mean for combining the peak value and the mean value for providing an iris driving voltage so that the iris may be open or shut according to the magnitude of the NAM signal.

11 Claims, 3 Drawing Sheets

FIG. I
PRIOR ART

IRIS CIRCUIT OF A VIDEO CAMERA

BACKGROUND OF THE INVENTION

1. Field of the Invention

The present invention relates to an iris circuit of a video camera, and more particularly to an iris circuit which can automatically adjust the iris of a camera lens according to the magnitude of a NAM (non additive magnitude) signal which is provided by taking out the highest value from the peak values of red, green and blue color video signals.

2. Description of the Prior Art

In the conventional iris circuit, a parabola signal and a vertical sawtooth wave signal are compared with each other and amplified by a comparison amplifier. A gating pulse is generated by inverting the output of the comparison amplifier with a switching transistor, and gates a predetermined range of the NAM signal provided through a buffer. The gated NAM signal is integrated and amplified by an integrator and an amplifier respectively and then inverted and amplified by another amplifier to which a control voltage is provided. The iris of the lens is made to open or shut depending upon the inverted and amplified control voltage. However, such an iris gating circuit must be complicated in order that the iris may not be affected by the sky or by strong rays of light. Accordingly, it not only causes the manufacturing cost to go up but also involves a problem in that a picture is taken doubly because the iris is not shut even when a built-in shutter is used by turning on a diascope switch.

SUMMARY OF THE INVENTION

It is an object of the present invention to provide an iris circuit which can automatically adjust opening and shutting of the iris according to the magnitude of a NAM signal when a diascope switch is off.

In accordance with the present invention, there is provided an iris circuit of a video camera comprising: means for detecting the peak value of an input NAM signal; means for detecting the mean value of the NAM signal; and means for combining the peak value and the mean value of the NAM signal, the combining means amplifying the combined value by comparison with a reference voltage for providing an iris driving voltage to an iris driving circuit.

BRIEF DESCRIPTION OF THE DRAWINGS

The present invention will now be described by way of illustrative examples with reference to the accompanying drawings, in which.

DETAILED DESCRIPTION OF THE PREFERRED EMBODIMENT

Figure 1:
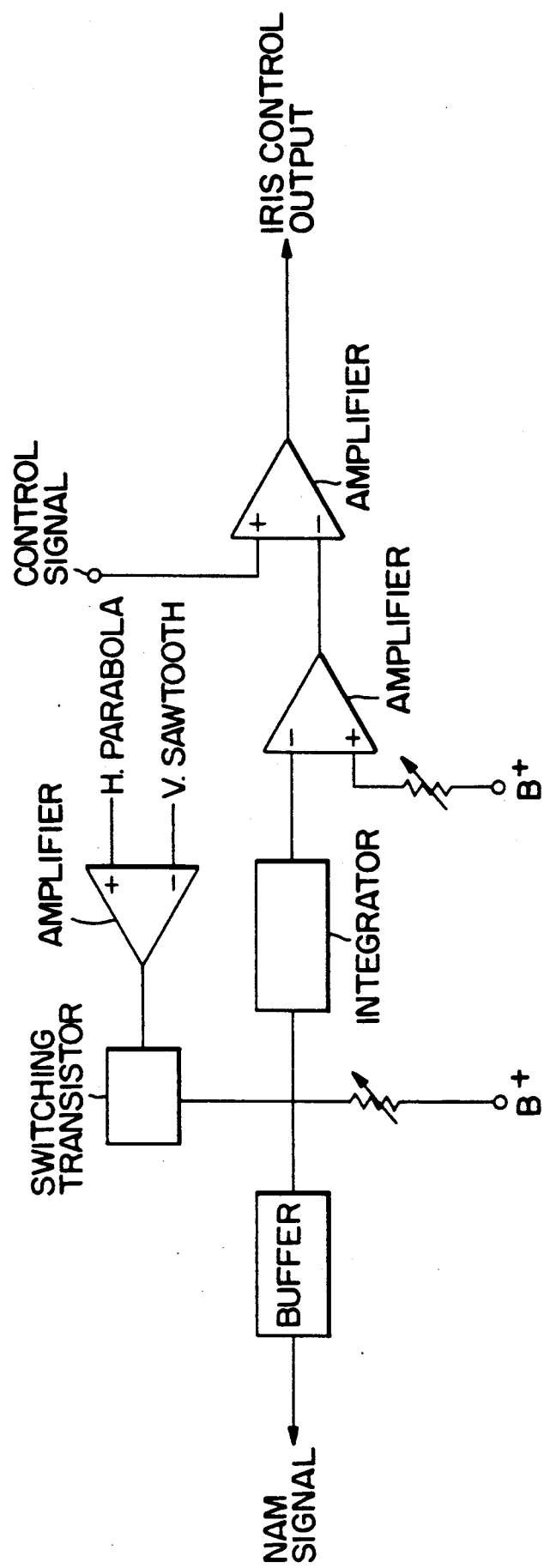
FIG. 1 is a schematic circuit diagram of the conventional iris circuit.
Figure 2:
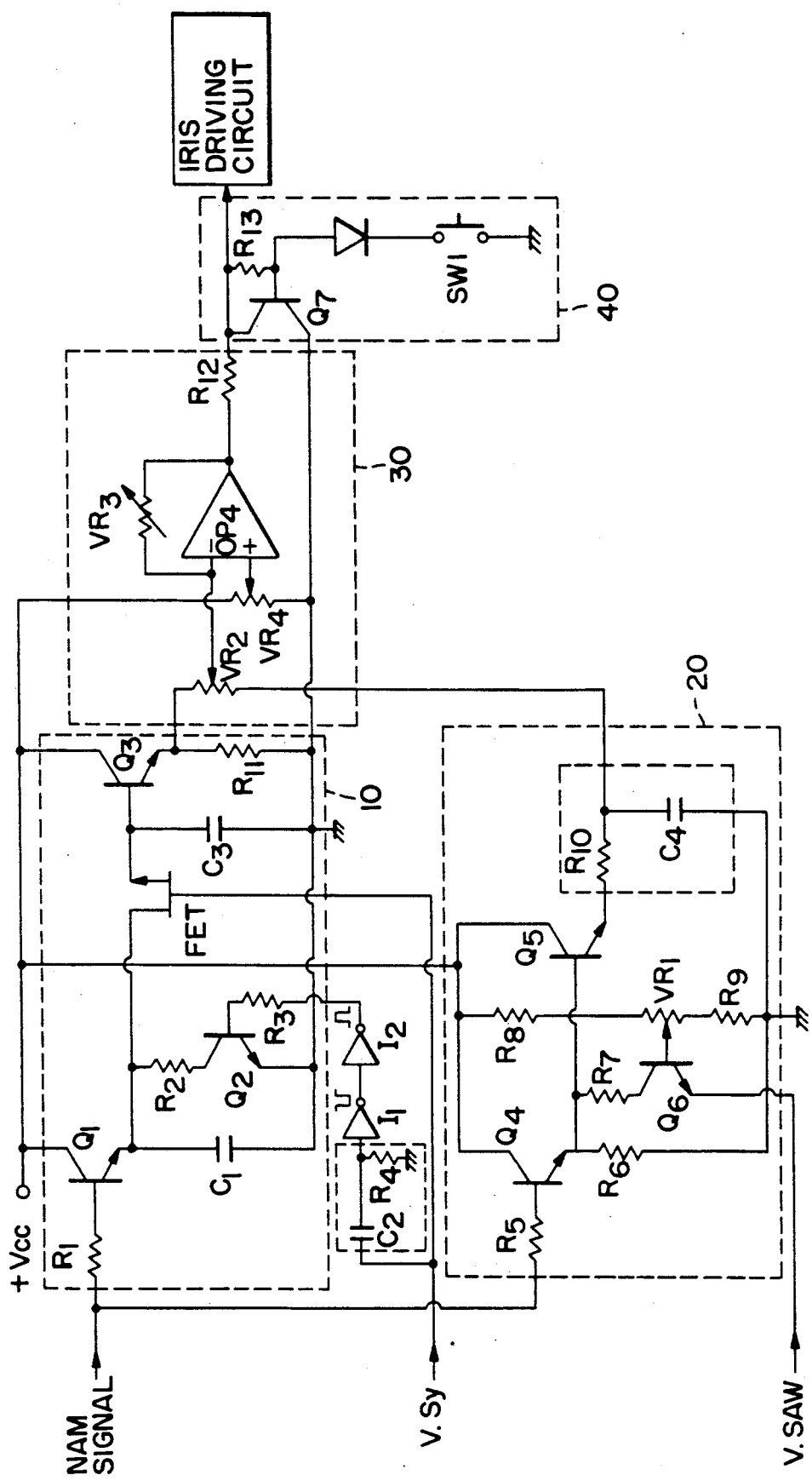
FIG. 2 is a circuit diagram of the embodiment of the present invention.

Referring to FIG. 2 showing the embodiment of the present invention, a peak value detecting section 10 includes a first buffer transistor Q1 receiving a NAM signal, a field-effect transistor FET which passes or cuts out the output of the transistor Q1 in dependence upon a vertical synchronizing signal V. Sy provided through a delay circuit comprising a capacitor C2 and a resistor R4, first and second inverters I1 and I2 connected in series with the delay circuit for wave shaping, a first switching transistor Q2 which controls the output of the transistor Q1 to be bypassed to ground in dependence upon the vertical synchronizing signal delayed by the delay circuit, a capacitor C3 which charges the output voltage of the field-effect transistor FET and a second buffer transistor Q3 by which the charged voltage of the capacitor C3 is provided.

A mean value detecting section 20 includes a third buffer transistor Q4 receiving the NAM signal, a fourth buffer transistor Q5 receiving the output of the third transistor Q4, a second switching transistor Q6 which controls the operation of the fourth buffer transistor Q5 in dependence upon a vertical sawtooth wave signal V. SAW input thereto, the base voltage of this transistor Q6 being adjusted by a variable resistor VR1, and an integrating circuit consisting of a resistor R10 and a capacitor C4 and integrating the output of the fourth buffer transistor Q5. A combining section 30 includes a variable resistor VR2 which combines the peak value from the peak value detecting section 10 and the mean value from the mean value detecting section 20 and a comparison amplifier OP4 which amplifies the voltage combined by the variable resistor VR2 by comparison with the reference voltage set by a variable resistor VR4.

The NAM signal through a resistor R1 in the peak value detecting section 10 is applied to the drain D of the field-effect transistor FET and to the collector of the transistor Q2 through the first buffer transistor Q1. Thus, the field-effect transistor FET is turned on while the vertical synchronizing signal V. Sy is applied to the gate G of the field-effet transistor FET, causing the peak value of the NAM signal to be provided from the source S of the field-effect transistor FET and then to be charged to the capacitor C3.

On the other hand, while the peak value of the NAM signal is charged to the capacitor C3, the vertical synchronizing signal which is delayed for a predetermined amount of time by the delay circuit consisting of the capacitor C2 and the resistor R4, is applied to the base of the transistor Q2 through the inverters I1 and I2, causing the transistor Q2 to be turned on. Accordingly, the NAM signal from the first buffer transistor Q1 flows to ground through the transistor Q2 while the delayed vertical synchronizing signal is input thereto.

The peak value of the NAM signal charged to the capacitor C3 is applied to the one terminal of the variable resistor VR3 in the combing section 30 through the buffer transistor Q3.

Meanwhile, the NAM signal is also provided to the base of the third buffer transistor Q4 in the mean value detecting section 20 through the resistor R5. The NAM signal is then applied to the integrating circuit consisting of the resistor R10 and the capacitor C4 through the third and fourth buffer transistors Q4 and Q5 for being integrated by the integrating circuit.

At this time, the transistor Q6 is turned on or off in dependence upon the vertical sawtooth wave signal V. SAW input to the emitter of the transistor Q6 because the base voltage of the transistor Q6 is set by the variable resistor VR1 connected in series with the resistors R8 and R9.

Figure 3B:
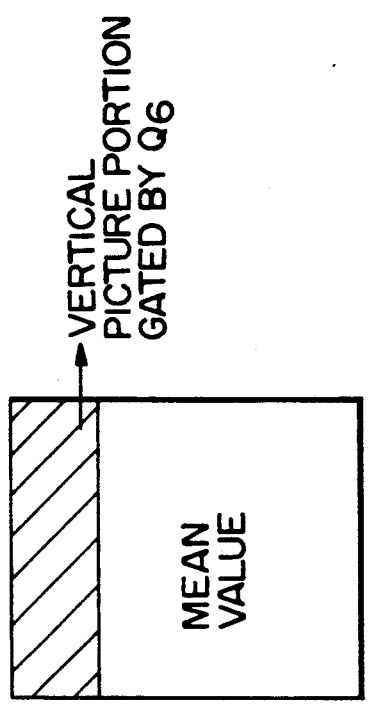
FIG. 3B illustrates a vertical picture with the upper portion thereof gated by the circuit of FIG. 2.
Figure 3A:
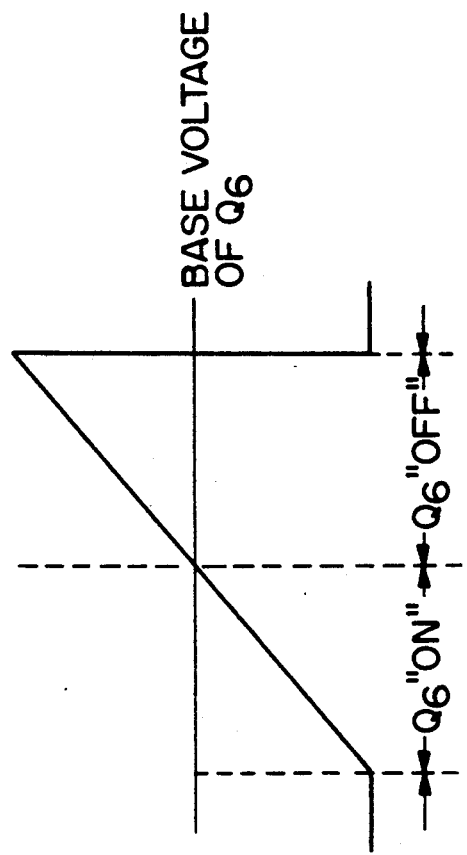
FIG. 3A is a graph showing the operation of a transistor as a function of an applied sawtooth waveform.

In other words, as shown in FIG. 3A, if the emitter voltage of the transistor Q6, to which the vertical sawtooth wave signal V. SAW is provided, is lower than the base voltage thereof, the transistor Q6 is turned on and the NAM signal from the third buffer transistor Q4 is not applied to the fourth buffer transistor Q5. If the emitter voltage of the transistor Q6, however, is higher than its base voltage, the transistor Q6 is turned off and the NAM signal from the transistor Q4 is applied to the transistor Q5. Thus, the upper portion of the vertical picture is gated while the transistor Q6 is turned on as shown in FIG. 3B and the mean value of the remaining portion of the vertical picture is charged to the capacitor C4.

The mean value of the NAM signal detected from the mean value detecting section 20 and the peak value of the NAM signal detected from the peak value detecting section 10 are combined by the variable resistor VR2 in the combining section 30. This variable resistor VR2 is for setting the operating point of the iris.

The value combined by the variable resistor VR2 in such a manner is provided to the inverting terminal (−) of the comparison amplifier OP4, and to the non-inverting terminal (+) thereof, the reference voltage set by the variable resistor VR4 is provided.

If the voltage provided to the inverting terminal (−) of the comparison amplifier OP4 is lower than the reference voltage at the non-inverting terminal (+) thereof, a positive voltage is provided from the comparison amplifier OP4 to an iris driving circuit, resulting in that the iris of the lens is opened in proportion to the level of the output voltage. If the voltage provided to the inverting terminal (−) of the comparison amplifier OP4 is higher than the reference voltage at the non-inverting terminal (+) thereof, the input voltage is amplified with the gain set by the variable resistor VR3 and then provided to the iris driving circuit, resulting in that the iris is closed in proportion to the level of the output voltage.

The reason for gating the upper portion of the vertical picture (see FIG. 3B) is to prevent the iris of the lens from being affected by the sky or by strong rays of light.

On the other hand, a diascope switch circuit 40 includes a switching transistor Q7, a diode D1 and a diascope switch SW1. If the diascope switch SW1 is manually turned on, the transistor Q7 and the diode D1 are also turned on and the output voltage of the comparison amplifier OP4 is by-passed to ground, causing the iris driving circuit not to be operated.

From the foregoing, it will be apparent that the present invention provides a novel iris circuit which can prevent the picture from being taken doubly by controlling the iris of the camera lens to open or shut according to the magnitude of the input NAM signal. Furthermore, the circuitry can be simplified by comparison with the conventional circuit, and this substantially reduces the manufacturing cost.

While the present invention has been described and illustrated herein with reference to the preferred embodiment thereof, it will be understood by those skilled in the art that various changes in form and details may be made therein without departing from the spirit and scope of the invention.

What is claimed is:

1. An iris control circuit for a video camera, comprising:
   peak value detecting means for detecting the peak value of an input non-additive magnitude (NAM) video signal and for providing a peak value signal output corresponding thereto in response to a vertical synchronizing signal applied thereto;
   mean value detecting means for detecting the mean value of said NAM signal and for providing a mean value signal output corresponding thereto during a selected portion of a vertical sawtooth wave signal applied thereto; and
   combining means for said peak value signal and said mean value signal, said combining means amplifying the combined value thereof by comparison with a predetermined reference voltage for providing an iris driving voltage to an iris driving circuit of a video camera so that an iris of said video camera is opened or closed according to the magnitude of said NAM signal.

2. The iris control circuit of claim 1, wherein said peak value detecting means includes first and second buffer transistors, a field-effect transistor passing or cutting out the output of said first buffer transistor in dependence upon said vertical synchronizing signal input thereto, a delay circuit means for delaying said vertical synchronizing signal for a predetermined amount of time, a first switching transistor controlling the output of said first buffer transistor to be bypassed to ground in dependence upon said vertical synchronizing signal from said delay circuit means, and a capacitor for charging the output voltage of said field-effect transistor.

3. The iris control circuit of claim 2, wherein said mean value detecting means includes third and fourth buffer transistors, a second switching transistor controlling the operation of said fourth buffer transistor in dependence upon said vertical sawtooth wave signal input thereto, the base voltage of said second switching transistor being adjusted by a first variable resistor, and an integrator for integrating the output of said fourth buffer transistor.

4. The iris control circuit of claim 2, wherein said combining means includes a second variable resistor for combining said peak value signal and said mean value signal, and a comparison amplifier for amplifying the combined value form said second variable resistor by comparison with a preset reference voltage for providing said iris driving voltage to said iris driving circuit.

5. An iris control circuit for a video camera, comprising:
   peak value detecting means for detecting the peak value of an input non-additive magnitude (NAM) signal derived by taking out the highest value from the peak values of respective red, green and blue color video signal components of an image signal, and for providing a peak value signal, corresponding to said detected peak value of said input NAM signal, in response to and at a timing determined by a vertical synchronization signal applied thereto;
   mean value detecting means for detecting a mean value of said input NAM signal and for providing a mean value signal, corresponding to said detected mean value of said input NAM signal, during a selected portion of a period of a vertical sawtooth wave signal applied thereto;
   combining means for combining said peak value signal and said mean value signal and for setting an operating point of an iris of a video camera; and
   comparison amplifier means for comparing the combined value of said peak value signal and mean value signal with a predetermined reference voltage and providing an iris driving voltage in accordance with said comparison.

6. The iris control circuit according to claim 5, wherein said mean value detecting means provides said mean value signal during only a selected portion of the period of said applied vertical sawtooth wave signal such that no mean value signal is provided by said mean value detecting means during an upper vertical portion of said image signal.

7. The iris control circuit according to claim 5, wherein said peak value detecting means comprises:
first buffer circuit means for buffering said input NAM signal;
delay circuit means operably connected with an input for said applied vertical synchronizing signal, for delaying said applied vertical synchronizing signal by a predetermined amount of time to provide a delayed vertical synchronizing signal;
charging circuit means operably connected with said first buffer circuit, for charging the peak value of said input NAM signal from said first buffer means in response to said applied vertical synchronizing signal;
switching circuit means operably connected with said first buffer circuit means and said delay circuit means, for by-passing the buffered NAM signal from said first buffer circuit means to ground in response to said delayed vertical synchronizing signal; and
second buffer circuit means operably connected with said charging circuit means, for buffering the peak value charged by said charging circuit means and for providing said peak value signal corresponding thereto.

8. The iris control circuit according to claim 5, wherein said mean value detecting means comprises:
first buffer circuit means for buffering said input NAM signal;
second buffer circuit means operably connected with said first buffer circuit means, for further buffering said input NAM signal;
switching circuit means having an input for said vertical sawtooth wave signal and operably connected with said second buffer circuit means, for controlling operation of said second buffer circuit means for passing or blocking said input NAM signal in response to said applied vertical sawtooth wave signal, said switching circuit means including means for selecting an operating threshold point of said second buffer circuit in response to said applied vertical sawtooth wave signal; and
integrating circuit means operably connected with said second buffer circuit means for integrating said input NAM signal from said second buffer circuit means for thereby providing said mean value signal corresponding to a mean value thereof.

9. The iris control circuit according to claim 5, wherein said combining means comprises a variable resistor operably connected between an output of said second buffer circuit means of said peak value detecting means and an output of said integrating circuit means of said mean value detecting means.

10. The iris control circuit according to claim 5, wherein said comparison amplifier means comprises a comparator means having respective comparator inputs operably connected with said combining means for receiving said combined value of said peak value signal and said mean value signal therefrom and with a reference voltage source, respectively, for comparing said combined value with said reference voltage and for providing and output iris driving voltage in accordance with said comparison.

11. The iris control circuit according to claim 5, further comprising:
diascope switch means operably connected with an output of said comparison amplifier means for selectively by-passing said iris driving voltage to ground, for disabling said iris driving circuit.

* * * * *

UNITED STATES PATENT AND TRADEMARK OFFICE
CERTIFICATE OF CORRECTION

PATENT NO. : 5,053,878
DATED : October 1, 1991
INVENTOR(S) : Sang Jo Park, et. al.

It is certified that error appears in the above-identified patent and that said Letters Patent is hereby corrected as shown below:

On the Title page under item [19], change "Sang Jo et al." to --Park et al.--;

item [54], change "IRIS CIRCUIT OF A VIDEO CAMERA" to --IRIS CONTROL CIRCUIT FOR A VIDEO CAMERA DETECTING PEAK AND MEAN VALUES OF A NON-ADDITIVE MAGNITURE (NAM) INPUT SIGNAL;

item [75], change "Park Sang Jo" to --Sang Jo Park--, and change "Lee Sang Ho" to -- Sang Ho Lee--, and change "Eom Young Ku" to-- Young Ku Eom--.

Signed and Sealed this

Twenty-sixth Day of January, 1993

*Attest:*

STEPHEN G. KUNIN

*Attesting Officer*  Acting Commissioner of Patents and Trademarks